(12) United States Patent
Kapaun et al.

(10) Patent No.: US 11,746,298 B2
(45) Date of Patent: Sep. 5, 2023

(54) PROCESS FOR RECOVERING POLYMER OIL

(71) Applicant: UOP LLC, Des Plaines, IL (US)

(72) Inventors: Nickolas D. Kapaun, Chicago, IL (US); Joseph A. Montalbano, Elmhurst, IL (US); Jeffrey Tyska, Chicago, IL (US); Ping Sun, Hinsdale, IL (US); Andrew Pickens, Jenkins, OK (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 17/556,785

(22) Filed: Dec. 20, 2021

(65) Prior Publication Data

US 2023/0193139 A1    Jun. 22, 2023

(51) Int. Cl.
| | |
|---|---|
| *C10G 1/10* | (2006.01) |
| *C10G 1/02* | (2006.01) |
| *C10G 55/04* | (2006.01) |
| *C10G 31/06* | (2006.01) |
| *B29B 17/04* | (2006.01) |

(52) U.S. Cl.
CPC .............. *C10G 1/02* (2013.01); *C10G 31/06* (2013.01); *C10G 55/04* (2013.01); *B29B 2017/0496* (2013.01); *C10G 2300/1003* (2013.01)

(58) Field of Classification Search
CPC ........................... C10G 1/10; C10G 2300/1003
See application file for complete search history.

(56) References Cited

U.S. PATENT DOCUMENTS

| | | | |
|---|---|---|---|
| 4,105,502 A | | 8/1978 | Choi |
| 4,260,473 A | * | 4/1981 | Bauer .................... C10G 1/045 |
| | | | 201/2.5 |
| 5,731,483 A | * | 3/1998 | Stabel .................... B29B 17/02 |
| | | | 208/130 |
| 6,011,187 A | | 1/2000 | Horizoe et al. |
| 2007/0007174 A1 | | 1/2007 | Strack et al. |
| 2012/0261247 A1 | * | 10/2012 | McNamara ............... F23G 5/02 |
| | | | 201/25 |
| 2019/0177620 A1 | | 6/2019 | Posmyk et al. |
| 2022/0228070 A1 | * | 7/2022 | Chakraborty ............. B09B 3/40 |

FOREIGN PATENT DOCUMENTS

CN           105567264 A     5/2016

OTHER PUBLICATIONS

Search Report and Written Opinion for PCT/US2022/081656 dated Apr. 28, 2023.

\* cited by examiner

*Primary Examiner* — Randy Boyer
(74) *Attorney, Agent, or Firm* — Paschall & Associates, LLC; James C. Paschall

(57) ABSTRACT

Process and apparatus for recovering a product stream from a waste plastic feedstock and reducing the endpoint of the product stream is provided. A polymer oil is produced as a product stream by pyrolyzing the waste plastic feedstock in a pyrolysis reactor to produce a pyrolysis reactor effluent and passing the reactor effluent stream to a contact condensing column. In the contact condensing column, the pyrolysis reactor effluent stream is separated into a vapor product stream and a liquid product stream. The vapor product stream is recovered from the condensing column and the liquid product stream is passed back to the pyrolysis reactor for further reduction.

9 Claims, 3 Drawing Sheets

PROCESS FOR RECOVERING POLYMER OIL

FIELD

The field relates to recovering polymer oil from waste plastic feedstocks and converting into hydrocarbon products. More particularly relates to a process for converting waste plastics into hydrocarbon products by separating and cooling pyrolysis effluent before sending the effluent to a steam cracking unit.

BACKGROUND

Past plastic recycling paradigms can be described as mechanical recycling. Mechanical recycling entails sorting, washing, and melting recyclable plastic articles to molten plastic materials to be remolded into a new clean article. The melt and remolding paradigm have encountered several limitations. Additionally, recyclable plastic articles must be properly cleaned to remove non-plastic residues before melting and remolding which also adds to the expense of the process. The mechanically recovered plastic also has a limit on the percentage used in newly made plastics.

A paradigm shift has enabled the chemical industry to rapidly respond with new chemical recycling processes for recycling waste plastics. The new paradigm is to chemically convert the recyclable plastics to liquids in a pyrolysis process operated at about 350° C. to 600° C. The liquids can be refined in a refinery to fuels, petrochemicals and even monomers that can be re-polymerized to make virgin plastic resins. The pyrolysis process still requires separation of collected non-plastic materials from plastic materials fed to the process. Another requirement in plastic pyrolysis is to convert pyrolysis effluent into useful hydrocarbon products and polymer grade oil. Of late, it is seen that polymer oil recovered from waste plastic pyrolysis process often cannot directly be routed to a steam cracking for further separation and recovery.

Thus, the primary target is to manage polymer oil derived from a waste plastic pyrolysis process. Polymer oil is to be used as a feed to a naphtha steam cracking unit, where the hydrocarbon chains are cracked into light olefins such as ethylene and propylene, which are subsequently used to produce polymers like polyethylene and polypropylene. Most operators of the steam cracking units have a specification for feed endpoint such as the final boiling point as measured by ASTM D86, D1160, D2887, or other methods. The feed endpoint specification is much lower than the polymer oil endpoint when produced by a plastic pyrolysis unit.

In a conventional plastic pyrolysis unit, molten plastic is heated in a continuously stirred tank reactor to produce hydrocarbon products by thermal cracking of the polymer chains. A vapor product consisting of non-condensable hydrocarbon gases, and a condensable hydrocarbon mixture such as polymer oil derived from waste plastic having a boiling point range of approximately about 35° C. to about 595° C. (i.e., about 95° F. to about 1100° F.) and small amounts of entrained non-volatile droplets of liquid are drawn from the top of the reactor for condensing and recovery.

Fractionation of the polymer oil vapors leaving the pyrolysis reactor is not possible due to the fouling characteristics of polymer oil. Also, it is known from the past commercial experience that the polymer oil contains impurities that will foul equipment and column internals such as fractionation trays and condensers. At present recovery of polymer oil is typically performed by multiple stages of contact condensing in spray towers, where each spray tower is equivalent to a cooler and equilibrium flash. However, current processes do not have a mechanism or any provision to selectively remove the heaviest hydrocarbons or entrained liquid droplets from the polymer oil effluent to control the endpoint of the polymer oil.

It is known that the endpoint of pyrolysis oil can be controlled by effluent processing of the polymer oil via a process such as hydrocracking or hydrotreating followed by fractionation, which is very capital and energy intensive. However, it is often seen that most commercial plastic pyrolysis units do not have an endpoint control mechanism and they are not able to route their polymer oil directly to steam cracking units without expensive refining and separation. Moreover, fractionation of the polymer oil after plastic pyrolysis results in plugging and fouling of equipment such as distillation trays or packing, condensers, and reboilers.

As such, the aim of this method is to provide a processing solution to all chemical manufacturers worldwide which derive hydrocarbon fuels or products, control the endpoint of the polymer oil derived from the pyrolysis oil and reduce the amount of heavy polymer oil product directed to the steam cracking units which hampers the operation of the steam cracking units. Therefore, there is a need to provide a process or an apparatus to reduce the endpoint of the polymer oil derived from waste plastic pyrolysis process and separate impurities from the polymer oil.

SUMMARY OF INVENTION

A process has been discovered for recovering a polymer oil from a waste plastic feedstock. The process includes pyrolyzing the waste plastic feedstock in a pyrolysis reactor to produce a pyrolysis oil stream. The pyrolysis oil stream is passed to a contact condensing column for recovering the light polymer oil stream.

These and other features, aspects, and advantages of the present disclosure are further explained by the following detailed description, drawing and appended claims.

BRIEF DESCRIPTION OF THE DRAWINGS

The various embodiments will hereinafter be described in conjunction with FIG. 1, wherein like numerals denote like elements.

Figure 1:
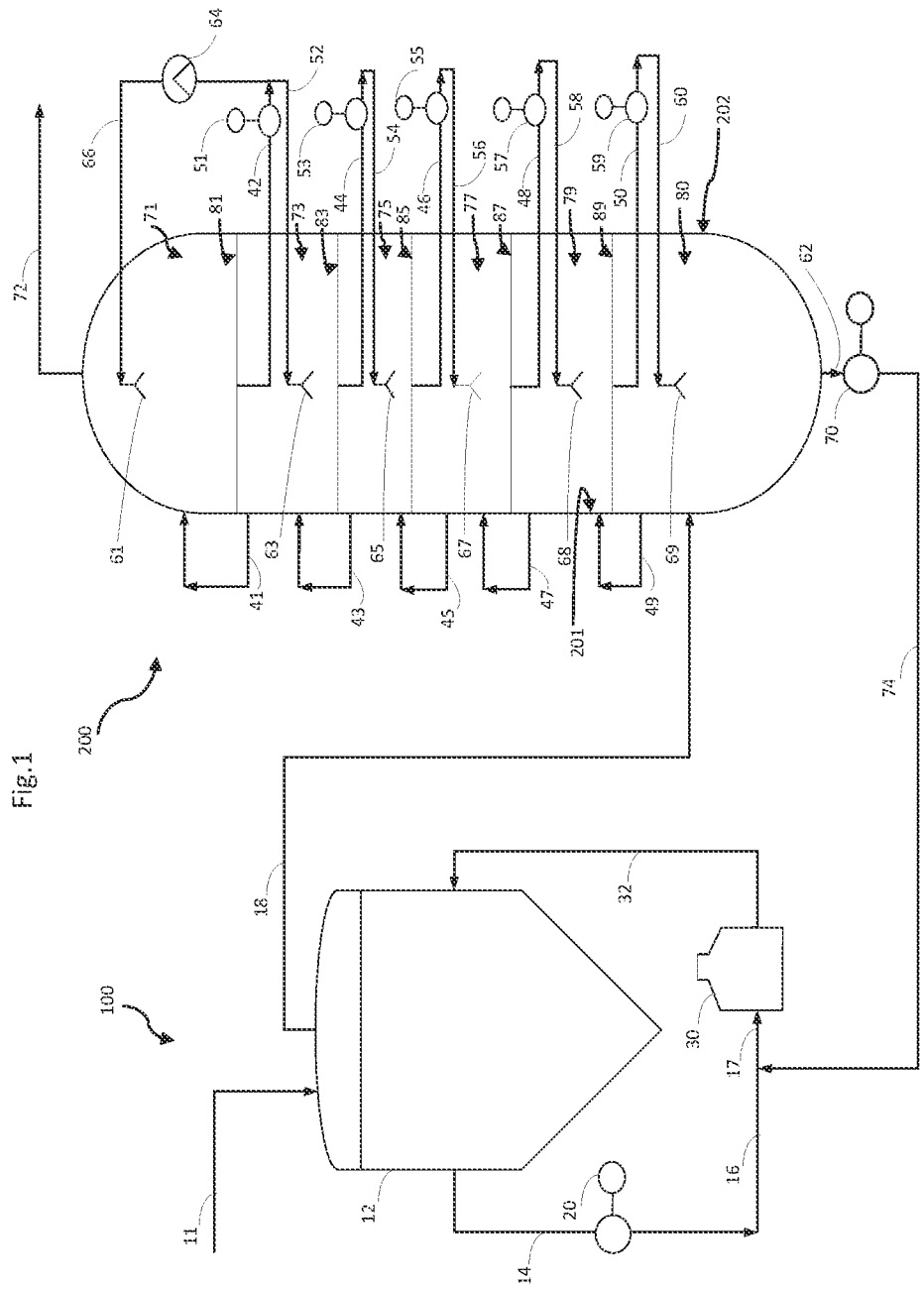
FIG. 1 is a schematic drawing of a pyrolysis reactor in integration with a contact condensing unit as disclosed in the present disclosure.
Figure 2:
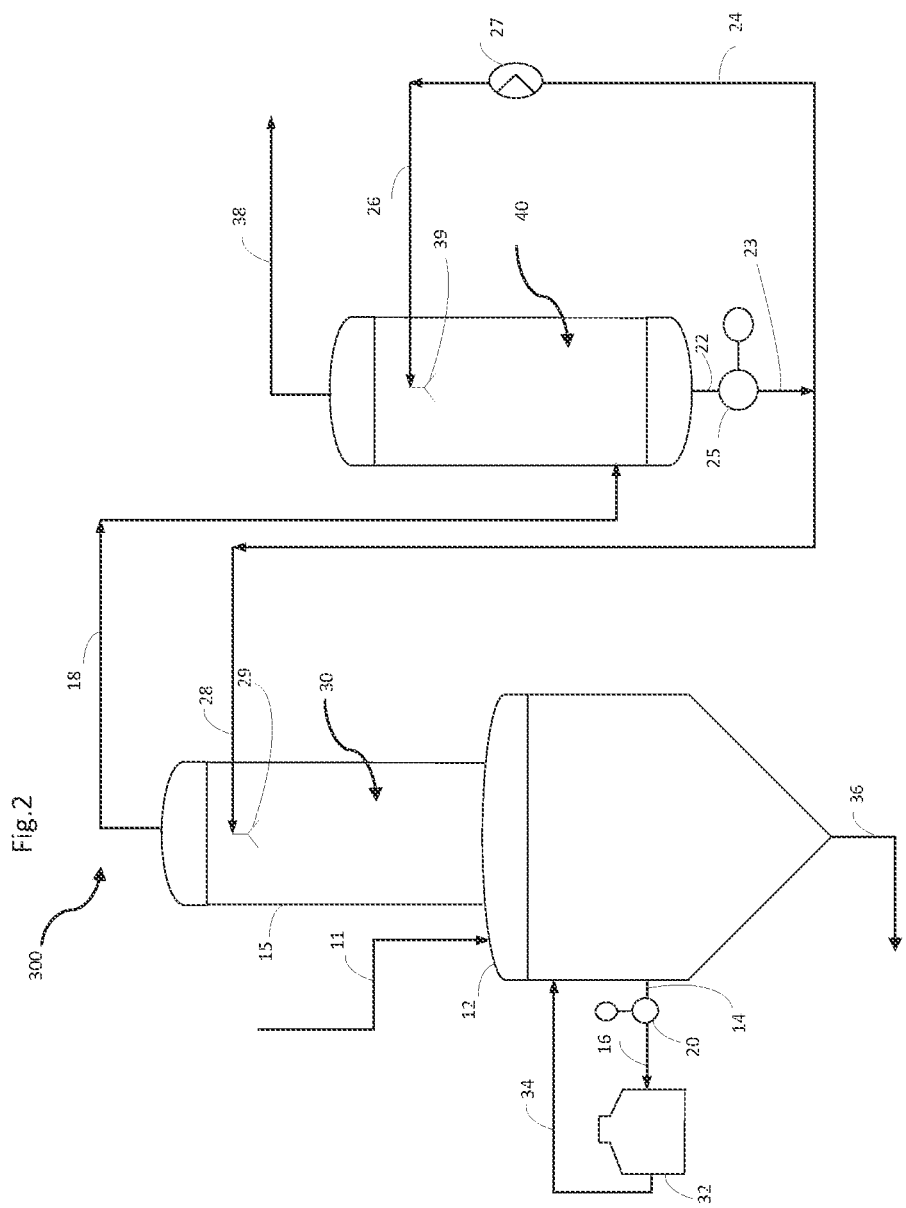
FIG. 2 is an alternative embodiment of the present disclosure showing a pyrolysis reactor with a vapor wash section.
Figure 3:
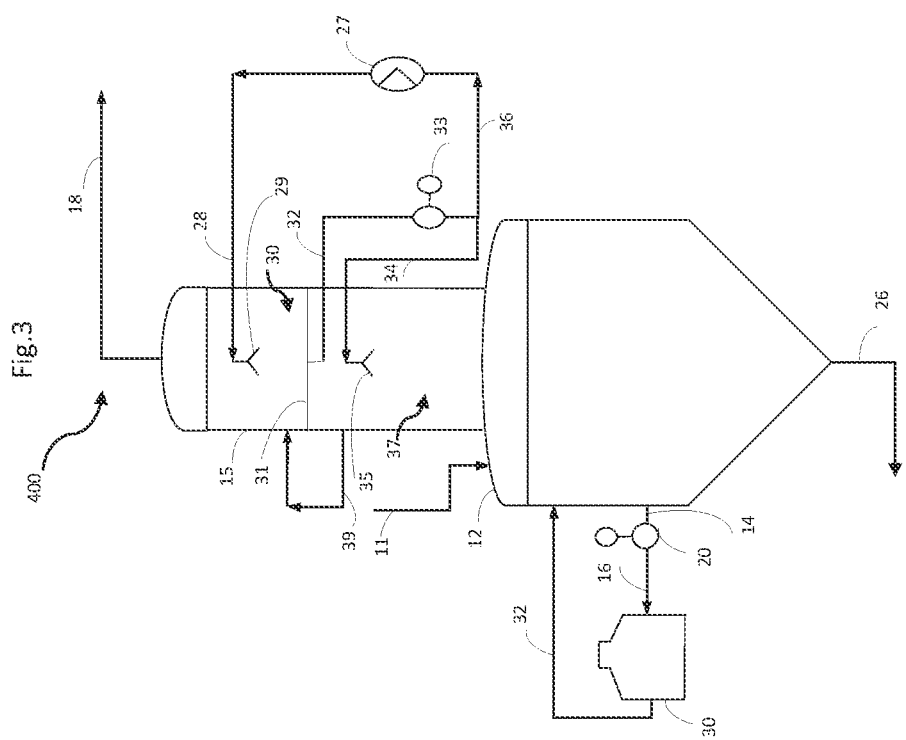
FIG. 3 is an alternative embodiment of the present disclosure showing a vapor wash section having multiple stages.

Skilled artisans will appreciate that elements in FIGS. 1-3 are illustrated for simplicity and clarity and have not necessarily been drawn to scale. For example, the dimensions of some of the elements in FIGS. 1-3 may be exaggerated relative to other elements to help to improve understanding of various embodiments of the present disclosure. Also, common but well-understood elements that are useful or necessary in a commercially feasible embodiment may not be depicted to facilitate a less obstructed view of these various embodiments of the present disclosure.

DEFINITIONS

The term "communication" means that fluid flow is operatively permitted between enumerated components, which may be characterized as "fluid communication".

The term "downstream communication" means that at least a portion of fluid flowing to the subject in downstream communication may operatively flow from the object with which it fluidly communicates.

The term "upstream communication" means that at least a portion of the fluid flowing from the subject in upstream communication may operatively flow to the object with which it fluidly communicates.

The term "direct communication" means that fluid flow from the upstream component enters the downstream component without passing through any other intervening vessel.

The term "indirect communication" means that fluid flow from the upstream component enters the downstream component after passing through an intervening vessel.

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 ... Cn where "n" represents the number of carbon atoms in the one or more hydrocarbon molecules. Furthermore, a superscript "+" or "−" may be used with an abbreviated one or more hydrocarbons notation, e.g., C3+ or C3−, which is inclusive of the abbreviated one or more hydrocarbons. As an example, the abbreviation "C3+" means one or more hydrocarbon molecules of three carbon atoms and/or more. In addition, the term "stream" may be applicable to other fluids, such as aqueous and non-aqueous solutions of alkaline or basic compounds, such as sodium hydroxide.

As used herein, the term "zone" can refer to an area including one or more equipment items and/or one or more units. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "weight percent" may be abbreviated "wt. %" and unless otherwise specified the notation "%" refers to "wt. %"".

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottom stream back to the bottom of the column. Feeds to the columns may be preheated. The top pressure is the pressure of the overhead vapor at the outlet of the column. The bottom temperature is the liquid bottom outlet temperature. Overhead lines and bottom lines refer to the net lines from the column downstream of the reflux or reboil to the column.

As used herein, the term "hour" may be abbreviated "hr", the term "kilopascal" may be abbreviated "kPa", the term "megapascal" may be abbreviated "MPa", and the terms "degrees Celsius" may be abbreviated "° C.".

DETAILED DESCRIPTION

We have discovered an improved process for processing a waste plastic pyrolysis effluent stream. The plastic pyrolysis effluent stream is produced by pyrolysis of waste plastic feedstock. The plastic pyrolysis effluent stream can be converted into a polymer oil product stream. The pyrolysis effluent stream is recovered at elevated temperature, cooled, and separated into lighter and heavier hydrocarbon products. The polymer oil product may be separated into a light polymer oil product stream and a heavy polymer oil product stream. By recovering the light olefin products early, they are preserved from cracking or oligomerizing into less desirable products. We have discovered a unique way to control the endpoint of polymer oil derived from pyrolysis of waste plastics while reducing the energy consumption for the process and without the need of further refining. The purpose for converting the pyrolysis effluent into the polymer oil product is solved by integrating the pyrolysis reactor with the contact column.

The disclosure reduces the need for any additional cracking of the pyrolysis effluent stream. The current need is fulfilled by using a multistage counter-current contact column in downstream communication with the pyrolysis reactor and coupled with a bottom recycle stream from the multistage contact column to be sent back to the pyrolysis reactor. This mechanism and the flow scheme will recycle the heaviest portion of the polymer oil back to the pyrolysis reactor, so that the recycled heavy polymer oil stream can be thermally cracked into lighter hydrocarbons or leave with the reactor drag stream. The overhead vapor from the multistage contact column is taken as a light polymer oil product, which has a lower endpoint than the vapor leaving the pyrolysis reactor.

In an embodiment, the plastic feed stream is received with minimal sorting and cleaning at a materials recycling facility (MRF). The plastic feed stream may be obtained from MRF that is otherwise sent to a landfill. As shown in FIG. 1, the waste plastic feedstock coming in from external sources via inlet line 11 is passed to the pyrolysis reactor 12 for pyrolysis in the pyrolysis reactor. The plastic feed may be compressed plastic material obtained from a separated bale of compacted plastic articles. The plastic articles can be chopped into plastic chips or particles which may be fed to pyrolysis reactor. An auger or an elevated hopper may be used transport the plastic feed as whole articles or as chips into the pyrolysis reactor. Plastic articles or chips may be heated to above the plastic melting point into a melt and injected or augured into the pyrolysis reactor. An auger may operate in such a way as to move whole plastic articles into the pyrolysis reactor and simultaneously melt the plastic articles in the auger by friction or by indirect heat exchange into a melt which enters the pyrolysis reactor in a molten state.

The reactor for pyrolysis of melt plastics may be a continuous stirred tank reactor, a rotary kiln, an augured reactor, or a fluidized bed reactor. The pyrolysis reactor may employ an agitator. In the pyrolysis reactor, the plastic feed stream is heated to a temperature that pyrolyzes the plastic feed stream to a pyrolysis product stream. The feed stream may be pyrolyzed using various pyrolysis methods including fast pyrolysis and other pyrolysis methods such as vacuum pyrolysis, slow pyrolysis, and others. Fast pyrolysis includes rapidly imparting a relatively high temperature to feedstocks for a very short residence time, and then rapidly reducing the temperature of the pyrolysis products before chemical equilibrium can occur. By this approach, the structures of the polymers are broken into chemical fragments that are initially formed by depolymerization and volatilization reactions. Pyrolysis can be carried out in a variety of pyrolysis reactors such as fixed bed pyrolysis reactors, fluidized bed pyrolysis reactors, circulating fluidized bed reactors, or other pyrolysis reactors.

In the pyrolysis reactor, the plastic feed stream is heated to a temperature of about 400° C. (752° F.), or suitably about 500° C. (932° F.) or preferably about 600° C. (1112° F.) to about 1100° C. (2012° F.) and to a pressure of about 0.5 to 2.0 bar (gauge). Feed is heated by a hot reactor recycle stream that is heated by a fired heater.

As shown in the embodiment of FIG. 1, a pyrolysis unit 100 has a pyrolysis reactor 12 into which a waste plastic feedstock is passed from an external source via line 11. An unreacted portion of the waste plastic feedstock in line 14 is recovered from the pyrolysis reactor 12. The unreacted portion of the waste plastic feedstock in line 14 is recovered from a first side of the pyrolysis reactor and passed to a pump 20 to provide a recycled stream of waste plastic feedstock in line 16. The waste plastic feedstock in line 16 is then passed to a heater 30 for reheating the waste plastic feedstock to make it suitable to be recycled to the pyrolysis reactor 12 for more thermal cracking. The heated portion of the waste plastic feedstock is recycled to the pyrolysis reactor 12 from a second side of the pyrolysis reactor in line 32. The plastic pyrolysis effluent stream is obtained from a top of the pyrolysis reactor in line 18 and is in direct fluid communication with a contact column unit 200. The plastic pyrolysis effluent stream in line 18 is fed to the bottom of the contact column 200. The plastic pyrolysis effluent stream in line 18 is then transferred to a multistage contact column for component separation of the plastic pyrolysis effluent stream to obtain a polymer oil stream.

The contact column unit 200 is a multistage contact column having more than one stage placed within a single contact column for contacting and separating the pyrolysis effluent stream into various components. The contact column may comprise multiple stages from 1 to 'n'. The contact column 200 is in direct, downstream communication with the pyrolysis reactor 12 and in downstream fluid communication with the pyrolysis reactor effluent line 18. The pyrolysis effluent stream in line 18 may be in a vapor phase and enters the contact column 200 at a bottom stage 80. The bottom stage 80 of the contact column is where the feed in line 18 is fed to the contact column 200, and a heavy bottom stream 62 is taken out from a bottom of the bottom stage 80 of the contact column.

The contact column 200 may comprise as many countercurrent contacting stages arranged in series as is required (e.g., stages 1, 2, . . . n) to achieve the desired separation and control the endpoint of the polymer oil product. The contact column 200 in FIG. 1 comprises a condensing stage 71, a first stage 73, a second stage 75, a third stage 77, a fourth stage 79, and so on up to "$n^{th}$" stage 80 which is a bottom stage. From the bottom stage 80 a heavier portion of the liquid stream is obtained via line 74 as a heavy polymer liquid stream or a liquid product stream which may be recycled to the pyrolysis reactor 12 by mixing it in line 17 with the unreacted portion of the waste plastic feedstock in line 14 prior to heating. The contact column 200 is provided with a single cooler 64 at the top of the column thereby forming a condensing stage 71. The condensing stage 71 discharges a vapor product stream via line 72 after making it to the top of the stages. The vapor product stream obtained from the top of the contact column 200 in line 72 is suitable for steam cracking and may be further processed (not shown) to recover lighter gaseous hydrocarbon products.

Vapor flowing up and liquid flowing down the column 200 contacts each other in each stage, and each stage comprises one or more inlets and outlets for feeding vapor and liquid to and from the stage. A liquid stream obtained from the bottom of each of the stages 71-79, excluding the bottom stage 80, that accumulates on the tray 81-89 is fed to a pump 51-59 to recirculate the liquid stream to the next stage 73-80 below. However, vapor is withdrawn from the top of the stages 73-80, excluding the condenser stage 71, from a side 201 at a point above the respective distributor 63-69 and is routed to the next stage 71-79 above.

In an embodiment, the contact column 200 comprises vapor-liquid spray contactors arranged in series, where each stage has a spray distributor hanging at the top of each stage and extending through the center of each stage to contact a vapor entering to a stage with the liquid exiting from the stage above, thereby leading to vapor-liquid stage. Liquid streams from each stage are moved between stages by passing them through pumps to provide sufficient pressure to achieve an even distribution of liquid at the spray nozzle. It is desirable to recover a net vapor product stream from a top of the contact column having an endpoint lower than that of the pyrolysis reactor vapor stream to reject hydrocarbons that boil above the endpoint specification. The endpoint of the net vapor product stream can be controlled by adjusting the operating parameters of the contact column 200. The temperature of the condenser stage 71 of the contact column 200 will be less than the temperature of the subsequent stages, i.e., first stage 73, the second stage, etc. because it is cooled. Unlike conventional distillation columns, the stages 71-80 of the contact column 200 are devoid of internal structures such as structural packing, random packing, downcomers or condensers to avoid the risk of fouling due to the presence of surface area on packings where the liquid product might deposit and lead to equipment fouling. The contact column 200 may be a spray column or a wash column having no column internals.

The contact column 200 promotes liquid-vapor contacting to achieve liquid and vapor component separation. The contact column 200 comprises one or more of spray distributors, nozzles, and trays located preferably inside the contact column. The spray distributors 63, 65, 67, 68, 69 are installed inside the column for distributing liquid collected from the stage above. The spray distributors are fed from a respective flow line extending from the side of the contact column towards the center of each stage to the spray distributor located in the center. The multiple stages 71, 73, 75, 77, 79, and 80 within the column are segregated via one or more trays 81, 83, 85, 87, and 89. The trays may be imperforate and may include a well that can be employed for liquid collection. The liquid collected on each of the trays from the stage above is taken out from the contact column via one or more liquid outlets lines or liquid flow lines 42, 44, 46, 48, and 50 from each stage. Each liquid flow line may be located below its respective tray. Liquid collected via one or more liquid flow lines 42, 44, 46, 48, and 50 are then passed through one or more pumps 51, 53, 55, 57, and 59 accordingly. The liquid streams from the pumps are then passed onto a stage below the preceding stage as inlet liquid streams. The inlet liquid streams in flow lines 52, 54, 56, 58, and 60 are passed onto the next stage below through respective spray distributors 63, 65, 67, 68, and 69 in downstream fluid communication with the flow lines. The spray distributors 63, 65, 67, 68, and 69 may comprise one or more spray nozzles (not shown) for spraying liquid downward into the stage. Further, each liquid collection tray 81, 83, 85, 87, and 89 are sealed to inner wall 201 of the contact column 200 along the entire periphery from inside. In the contact column 200 each stage 71, 73, 75, 77, 79, and 80 comprises vapor circulation lines 49, 47, 45, 43, and 41 for passing the vapor stream from a vapor inlet near a top of the stage up to the stage above, respectively, through a vapor outlet, that is below a vapor inlet for the respective stage. The vapor circulation lines help in recirculating the vapor streams in and out from the contact column.

The vapor from the first stage 73 is routed to the condenser stage 71 through a vapor recirculation line 41. From the contact condenser stage, a liquid stream is collected on a tray 81 as a reflux. The liquid stream is taken out from the column via liquid flow line 42 as an outlet liquid stream. The outlet liquid stream from flow line 42 passes through a pump 51 for recirculating a first portion of the outlet liquid stream as an inlet liquid stream via flow line 52 to the stage below. The inlet liquid stream in flow line 52 is then sprayed via a spray distributor 63 into the stage below 73. The vapor stream from stage 73 is taken out in circulation line 41 from the side 201 of the contact column to be recycled to the condenser stage 71. A second portion of the liquid stream in flow line 42 from the condenser stage is passed in line 66 through a cooler 64 to generate a cooled liquid stream which is recycled to the upper region of the condenser stage 71 and sprayed via the spray distributor 61 in the middle of the condenser stage 71.

The pyrolysis vapor stream in line 18 from the pyrolysis reactor 12 is routed to the vapor space of the bottom stage 80 (stage n) and contacted with liquid pumped from the stage 79. A continuous flow of the liquid product stream in line 62 is generated at the bottom stage 80 of the contact column 200 which may be recycled to the pyrolysis reactor 12 via line 74 after passing through a pump 70. The liquid product stream in line 74 is recycled to the pyrolysis reactor for thermal cracking of the liquid product thereby generating more lighter hydrocarbons as product. Vapor from the bottom stage 80 is recirculated to stage 79 above through recirculation line 49.

As shown in an alternative embodiment of FIG. 2, the pyrolysis reactor 12 is integrated with a wash section 15 comprising a reactor wash unit 300. The waste plastic feedstock is fed via line 11 to the pyrolysis reactor 12. The pyrolysis reactor produces a pyrolysis effluent stream 18, which undergoes further processing. The pyrolysis effluent stream in line 18 is passed to a downstream condenser column 40 to generate a condensed liquid stream via line 23. A portion of the condensed liquid stream is taken in line 24 forming a first part of liquid effluent is cooled in a cooler 27 to form a cooled liquid stream in flow line 26. The cooled liquid stream in flow line 26 is recycled to the top section of the condenser column 40 via the flow line 26. The cooled liquid stream in the flow line 26 is then sprayed into the condensation zone of condenser column 40 via spray distributor 39 located in the middle through the flow line 26 in the top portion of the column. The spraying liquid travels down the column towards a bottom of the column forming a liquid effluent stream in an exit line 22 which is passed to a pump 25. The pump 25 is located in the exit line 22 of the liquid effluent stream. The liquid effluent stream after being pumped is passed through line 24 and a recycle portion of the liquid effluent stream via line 28 is recycled to the top portion of the reactor wash section 15 as a second recycle stream.

The second recycled stream in flow line 28 extends to the middle of the wash section at the top and is sprayed into the wash section through a spray distributor 29. The wash section 15 is mounted on top of the pyrolysis reactor 12 and has a single stage 30. Similar to condensation column 40, the sprayed liquid stream travels down the wash section 15 and enters the pyrolysis reactor 12. From the pyrolysis reactor 12, the vapor effluent stream ascending up the wash section 15 is in vapor phase and comes in contact with the second recycled stream 28 sprayed from the distributor 29.

A net vapor product stream is generated from a top of the wash section and collected in line 18. The net vapor product stream in line 18 is taken out from the wash section has an endpoint lower than that of the pyrolysis reactor vapors ascending through the wash section. Due to the spray distributor 29 in a center of the wash section 15, the wash section 15 acts like a vapor-liquid spray contact column having a single stage 15. The vapor product stream from pyrolysis reactor 12 ascending through the wash section 15 is contacted with the cooled liquid effluent stream sprayed into the column via the spray distributor 29 to condense the heavier portion of the vapor product stream having higher molecular weight hydrocarbons, causing the condensate to descend back into the pyrolysis reactor 12. Consequently, the condensed liquid will not exit the pyrolysis reactor 12 through the wash column 15 until the condensed liquid is thermally cracked into lighter hydrocarbons in the pyrolysis reactor 12. Heavy components of the condensed liquid leave the pyrolysis reactor 12 as a reactor drag stream flowing in line 36 from a bottom of the pyrolysis reactor.

The wash section 15 may include more than one spray distributor 29 to distribute the cooled liquid stream as a reactor wash stream. The counter-current flow of sprayed liquid stream down through the ascending vapors will act as a stage of separation, selectively condensing heavier components into the liquid stream from the vapor stream generated in the pyrolysis reactor 12, while further vaporizing the lighter components in the liquid wash stream.

The endpoint of the vapor product in line 18 may be controlled by adjusting operating parameters in the condensation step. For example, a lower temperature or higher circulation rate in the condensing stage would increase the production of a liquid stream in the reactor wash section 15, thereby suppressing the endpoint of the vapor product stream in line 18.

In the embodiment of FIG. 2, a portion of the waste plastic feedstock from feed line 11 which is left unreacted in the pyrolysis reactor 12 is recovered from a side of the pyrolysis reactor 12 through a side outlet line 14 and passed through a pump 20 to provide a recycle stream of waste plastic feedstock in line 16. The waste plastic feedstock in line 16 is then passed through a heater 32 to reheat the waste plastic feedstock to make it suitable to be recycled to the pyrolysis reactor 12 for further thermal cracking. The heated portion of the waste plastic feedstock is recycled to the pyrolysis reactor 12 through feed line 34 to the side of the pyrolysis reactor.

In an alternative embodiment as shown in FIG. 3, the reactor wash unit 400, comprises a wash section 15 wherein the wash section comprises two or more stages 30 and 37. In this embodiment, the operation of the top condensing stage 30 of FIG. 3 is same as the vapor-liquid contacting operation of stage 40 of FIG. 2 as described above. The liquid outlet stream 36 is cooled in a cooler 27 and recycled to the top condensing stage 30 via recycle liquid flow line 28 entering the condensing stage near the top. The liquid stream is sprayed via spray distributor 29 into the condensing stage 30 extending in the middle of the top portion of the condensing stage. The net vapor flows upwards through the column and is taken out via line 18 from a top of the wash section 15. However, in FIG. 3, there is included an additional stage 37 which is similar in operation to stage 30 of FIG. 2 above.

The contacting stage 37 includes a tray 31 for collecting all the condensed liquid from the first condensing stage 30. The liquid collected onto tray 31 is taken out from stage 30 via a liquid outlet line 32 and passed through a pump 33 to recirculate the liquid stream as an inlet liquid stream to the contacting stage 37. A first portion of recirculated liquid stream is passed as the inlet liquid stream via flow line 34 into the contacting stage 37 of the wash column 15 and a second portion of the recirculated liquid stream is recycled via flow line 36 back to the condensing stage 30 by passing it through a cooler 27 thereby forming a cooled liquid stream in line 28. The first portion of the liquid inlet stream in line 34 is sprayed into the contacting stage 37 of the wash column 15 through a spray distributor 35 to contact the ascending vapors ascending from the pyrolysis reactor 12.

A vapor product stream is generated from the contacting stage 37 is taken out through a vapor outlet line 39 to be passed as the vapor inlet stream to the condensing stage 30 above. A net vapor product stream is obtained from the top of the wash column in line 18 with a reduced end point. A net liquid product stream is generated from the bottom of the pyrolysis reactor in line 26 being collected as a drag stream. The rest of the components of process shown in FIG. 3 operates as FIG. 2 described above.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general, or specific, direct, or indirect, wired, or wireless, encrypted or not encrypted, and/or combination(s) thereof; the specification is not intended to be limiting in this respect.

EXAMPLE

We conducted a simulation of contacting columns described in FIGS. 1 and 2. The simulation utilized three contacting stages, plus one condensing stage. The details are provided herein for the streams flowing in and out of the pyrolysis reactor and the contact column control the endpoint of the light polymer oil stream recovered from top of the contact column.

Table 1 provides flow rate, in line temperature and end points of the pyrolysis reactor effluent stream 18, vapor product stream 72, and liquid product stream 74. Table 1 provides a comparison of the base case with no endpoint control, an in-situ arrangement of the wash section 15 stacked on top of the pyrolysis reactor 12 of FIG. 2, and the multistage contact column 200 with bottom recycle in line 74 to the pyrolysis reactor 12 of FIG. 1.

TABLE 1

| Case | Base Case, with no endpoint control | In-situ reactor Wash + recycle | Multistage contactor + recycle |
|---|---|---|---|
| Pyrolysis Reactor Effluent Stream | | | |
| Flow rate, kg/hr | 3540 | 8656 | 7950 |
| Temperature, ° C. | 400 | 366 | 400 |
| Endpoint, ° C. | 538 | 469 | 538 |
| Liquid Bottom Recycle Stream | | | |
| Flow Rate, kg/hr | 0 | 5173 | 4486 |
| Temperature, ° C. | — | 308 | 365 |
| Endpoint, ° C. | — | 504 | 554 |
| Vapor Product Stream | | | |
| Flow rate, kg/hr | — | 3492 | 3464 |
| Temperature, ° C. | — | 306 | 285 |
| Endpoint, ° C. | — | 380 | 383 |

The use of the wash columns enabled reduction of the end point of the light polymer oil stream from the top of the wash column relative to the pyrolysis effluent stream.

The foregoing example is intended to further illustrate the subject embodiments. These illustrations of different embodiments are not meant to limit the claims to the particular details of the example.

SPECIFIC EMBODIMENTS

While the following is described in conjunction with specific embodiments, it will be understood that this description is intended to illustrate and not limit the scope of the preceding description and the appended claims.

A first embodiment of the invention is a process for recovering a product stream from a waste plastic feedstock comprising pyrolyzing the waste plastic feedstock in a pyrolysis reactor to produce a pyrolysis reactor effluent stream; passing the pyrolysis reactor effluent stream to a contact condensing column; and recovering from the contact condensing column a vapor product stream. An embodiment of the invention is one, any or all of prior embodiments in this paragraph up through the first embodiment in this paragraph wherein the pyrolysis reactor effluent stream is fed to a bottom of the contact condensing column. An embodiment of the invention is one, any or all of prior embodiments in this paragraph up through the first embodiment in this paragraph further comprising separating the pyrolysis reactor effluent stream in the contact condensing column to recover the vapor product stream and a liquid product stream. An embodiment of the invention is one, any or all of prior embodiments in this paragraph up through the first embodiment in this paragraph wherein the liquid product stream is recycled to the pyrolysis reactor as a recycled liquid stream. An embodiment of the invention is one, any or all of prior embodiments in this paragraph up through the first embodiment in this paragraph wherein the recycled liquid stream is recovered from a bottom of the contact condensing column and passed to the pyrolysis reactor. An embodiment of the invention is one, any or all of prior embodiments in this paragraph up through the first embodiment in this paragraph wherein the vapor product stream has a boiling endpoint lower than the pyrolysis reactor effluent stream. An embodiment of the invention is one, any or all of prior embodiments in this paragraph up through the first embodiment in this paragraph wherein the contact condensing column is a counter current column. An embodiment of the invention is one, any or all of prior embodiments in this paragraph up through the first embodiment in this paragraph wherein the contact condensing column is in downstream fluid communication with the pyrolysis reactor. An embodiment of the invention is one, any or all of prior embodiments in this paragraph up through the first embodiment in this paragraph wherein the contact condensing column comprising more than one contacting stages. An embodiment of the invention is one, any or all of prior embodiments in this paragraph up through the first embodiment in this paragraph wherein each contacting stage comprise a spray distributor extending from one side of each contacting stage towards a center of each contacting stage in the contact condensing column. An embodiment of the invention is one, any or all of prior embodiments in this paragraph up through the first embodiment in this paragraph wherein the spray distributor comprises a spray nozzle or an array of spray nozzles for spraying a liquid stream onto the next contacting stage.

A second embodiment of the invention is an apparatus comprising a pyrolysis reactor to produce a pyrolysis reactor effluent stream; a contact condensing column in fluid communication with the pyrolysis reactor to produce a vapor product stream and a liquid stream; and a liquid collector and a spray distributor in the contact column, the spray distributor being in a downstream fluid communication with the liquid collector. An embodiment of the invention is one, any or all of prior embodiments in this paragraph up through the second embodiment in this paragraph wherein the contact column is a counter-current contact column. An embodiment of the invention is one, any or all of prior embodiments in this paragraph up through the second embodiment in this paragraph wherein the contact column comprises more than one contacting stages. An embodiment of the invention is one, any or all of prior embodiments in this paragraph up through the second embodiment in this paragraph wherein the spray distributor extends in a middle of each of the contacting stage. An embodiment of the invention is one, any or all of prior embodiments in this paragraph up through the second embodiment in this paragraph wherein each of the spray distributor comprises a spray nozzle or an array of spray nozzles for spraying wash liquid into each contacting stage.

A third embodiment of the invention is an apparatus comprising a pyrolysis reactor; a contact column in an overhead fluid communication with the pyrolysis reactor to produce an overhead vapor stream in an overhead vapor line; and a condenser column in downstream communication with the overhead vapor line of the contact column and the pyrolysis reactor. An embodiment of the invention is one, any or all of prior embodiments in this paragraph up through the third embodiment in this paragraph wherein the contact column is a single stage counter current contact column. An embodiment of the invention is one, any or all of prior embodiments in this paragraph up through the third embodiment in this paragraph wherein the contact column may be mounted on top of the pyrolysis reactor to directly receive the overhead effluent of the pyrolysis reactor. An embodiment of the invention is one, any or all of prior embodiments in this paragraph up through the third embodiment in this paragraph wherein the contact column and the condenser column further comprises a spray distributor in each of the column.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for recovering a product stream from a waste plastic feedstock comprising:
   pyrolyzing the waste plastic feedstock in a pyrolysis reactor to produce a pyrolysis reactor effluent stream;
   passing the pyrolysis reactor effluent stream to a contact condensing column; and
   recovering from the contact condensing column a vapor product stream,
   wherein the contact condensing column comprises more than one contacting stage, each contacting stage comprises a spray distributor extending from one side of each contacting stage towards a center of each contacting stage in the contact condensing column.

2. The process of claim 1 wherein the pyrolysis reactor effluent stream is fed to a bottom of the contact condensing column.

3. The process of claim 1 further comprising separating the pyrolysis reactor effluent stream in the contact condensing column to recover the vapor product stream and a liquid product stream.

4. The process of claim 3 wherein the liquid product stream is recycled to the pyrolysis reactor as a recycled liquid stream.

5. The process of claim 4 wherein the recycled liquid stream is recovered from a bottom of the contact condensing column and passed to the pyrolysis reactor.

6. The process of claim 1 wherein the vapor product stream has a boiling endpoint lower than the pyrolysis reactor effluent stream.

7. The process of claim 1 wherein the contact condensing column is a counter current column.

8. The process of claim 1 wherein the contact condensing column is in downstream fluid communication with the pyrolysis reactor.

9. The process of claim 1 wherein the spray distributor comprises a spray nozzle or an array of spray nozzles for spraying a liquid stream onto the next contacting stage.

* * * * *